US010718705B2

(12) United States Patent
Nakahara et al.

(10) Patent No.: US 10,718,705 B2
(45) Date of Patent: Jul. 21, 2020

(54) OPTICAL MEASUREMENT CELL, OPTICAL ANALYZER, AND MANUFACTURING METHOD FOR OPTICAL MEASUREMENT CELL

(71) Applicant: HORIBA Advanced Techno, Co., Ltd., Kyoto-shi, Kyoto (JP)

(72) Inventors: Tatsuya Nakahara, Kyoto (JP); Tomoko Seko, Kyoto (JP)

(73) Assignee: HORIBA ADVANCED TECHNO, CO., LTD., Kyoto-shi, Kyoto (JP)

( * ) Notice: Subject to any disclaimer, the term of this patent is extended or adjusted under 35 U.S.C. 154(b) by 0 days.

(21) Appl. No.: 16/281,480

(22) Filed: Feb. 21, 2019

(65) Prior Publication Data
US 2019/0271637 A1 Sep. 5, 2019

(30) Foreign Application Priority Data
Mar. 5, 2018 (JP) .................................. 2018-038446

(51) Int. Cl.
| G01N 21/09 | (2006.01) |
| G01N 21/05 | (2006.01) |
| G01N 21/15 | (2006.01) |
| G01N 21/01 | (2006.01) |

(52) U.S. Cl.
CPC ............. *G01N 21/09* (2013.01); *G01N 21/05* (2013.01); *G01N 21/15* (2013.01); *G01N 2021/0193* (2013.01); *G01N 2201/0227* (2013.01)

(58) Field of Classification Search
CPC ................................ G01N 21/09; G01N 21/05
USPC ....................................................... 356/246, 436
See application file for complete search history.

(56) References Cited

U.S. PATENT DOCUMENTS

| 2,942,520 | A | * | 6/1960 | Rose ....................... C12M 37/04 359/398 |
| 4,974,952 | A | * | 12/1990 | Focht ...................... G02B 21/34 356/246 |
| 5,414,556 | A | * | 5/1995 | Focht ...................... B01L 9/527 356/246 |

(Continued)

FOREIGN PATENT DOCUMENTS

JP 2016001135 A 1/2016

*Primary Examiner* — Roy M Punnoose
(74) *Attorney, Agent, or Firm* — Alleman Hall Creasman & Tuttle LLP

(57) ABSTRACT

An optical measurement cell including first and second translucent members, which sandwich an internal space storing test liquid, are configured so that light incident on the first translucent member passes through the internal space and is emitted from the second translucent member. The cell includes a first holding member that holds down the circumference of a light transmission area on an outward surface of the first translucent member; a second holding member that holds down the circumference of a light transmission area on an outward surface of the second translucent member; and seal members that are respectively interposed between the first translucent and holding members and between the second translucent and holding members. In addition, areas excluding parts of surfaces of the respective translucent members are coated with coated films, and the end parts of the coated films are positioned on light transmission area sides of the seal members.

7 Claims, 7 Drawing Sheets

(56) References Cited

U.S. PATENT DOCUMENTS

| | | | | |
|---|---|---|---|---|
| 7,518,720 B2* | 4/2009 | Kolp | ................... | G01N 21/09 |
| | | | | 356/244 |
| 8,390,812 B2* | 3/2013 | Yokoyama | ............. | G01N 21/05 |
| | | | | 356/432 |
| 8,699,031 B2* | 4/2014 | Arimoto | ............ | G01N 21/0303 |
| | | | | 356/440 |
| 2011/0299067 A1* | 12/2011 | Yokoyama | ............. | G01N 21/05 |
| | | | | 356/213 |

* cited by examiner

OPTICAL MEASUREMENT CELL, OPTICAL ANALYZER, AND MANUFACTURING METHOD FOR OPTICAL MEASUREMENT CELL

TECHNICAL FIELD

The present invention relates to an optical measurement cell used to measure the concentration or the like of a chemical such as hydrofluoric acid (HF) in a manufacturing process of, for example, semiconductors or the like, an optical analyzer using the optical measurement cell, and a manufacturing method for the optical measurement cell.

BACKGROUND ART

As disclosed in Patent Literature 1, this sort of optical measurement cell is one that is connected to a chemical pipe of a semiconductor manufacturing apparatus to allow a chemical to pass through the internal space thereof, and has paired optical windows sandwiching the internal space. In addition, measuring light is applied to one of the optical windows of the optical measurement cell, and transmitted light emitted from the other optical window is received by a light detector. This allows the concentration or the like of a predetermined component contained in the chemical to be calculated from the intensity of transmitted light through the chemical flowing through the optical measurement cell, and concentration control to chemical concentration to be set is performed.

In the past, for translucent members forming the paired optical windows in the optical measurement cell, quartz has been used, or when the chemical is hydrofluoric acid (HF) or the like that dissolves quartz, sapphire has been used.

However, even when any of quartz or sapphire is used for the translucent members, a main component (Si or Al) contained in the translucent members is dissolved in the chemical to cause contamination.

CITATION LIST

Patent Literatures

Patent Literature 1: Japanese Unexamined Patent Application Publication No. 2016-1135

SUMMARY OF INVENTION

Technical Problem

Therefore, in order to suppress the contamination, the present inventor has examined the formation of coated films on the surfaces of the translucent members by, for example, fluorine coating or the like.

However, when arranging the translucent members in a chamber to perform fluorine coating or the like on the surfaces of the translucent members by, for example, evaporation or the like, it is of course impossible to float the translucent members in the air and therefore it is necessary to support some parts of the translucent members by supporting bodies, and parts in contact with the supporting bodies cannot be formed with the coated films.

As a result, the boundaries between areas coated with the coated films and areas not coated appear on the surfaces of the translucent members, and from the end parts of the coated films in the boundary parts, the coated films peel off, thus diminishing the above-described contamination suppressing effect.

Therefore, the present invention has been made in order to solve the above-described problem, and the main object thereof is to form coated films, which prevent contact with a sample such as a chemical, on the surfaces of translucent members, as well as to prevent the coated films from peeling off.

Solution to Problem

That is, an optical measurement cell according to the present invention is one including a first translucent member and a second translucent member, which sandwich an internal space in which test liquid is stored, and configured so that light incident on the first translucent member passes through the internal space and is emitted from the second translucent member. In addition, the optical measurement cell further includes: a first holding member that holds down the circumference of a light transmission area through which the light transmits on an outward surface of the first translucent member facing the light incident side; a second holding member that holds down the circumference of a light transmission area through which the light transmits on an outward surface of the second translucent member facing the light emission side; and seal members that are respectively interposed between the first translucent member and the first holding member and between the second translucent member and the second holding member. Further, areas excluding parts of surfaces of the respective translucent members are coated with coated films, and end parts of the coated films are positioned on the light transmission area sides of the seal members.

In the optical measurement cell configured as described above, since the end parts of the coated films are positioned on the light transmission area sides of the seal members, areas contactable with the test liquid on the surfaces of the translucent members are respectively coated with the coated films, and therefore contamination can be suppressed.

In addition, since the end parts of the coated films are positioned on the light transmission area sides of the seal members, the coated films can be held down by the holding members. In doing so, holding down the end parts of the coated films makes it possible to prevent the coated films from peeling off. Also, the end parts of the coated films are positioned on the light transmission area sides of the holding members, and therefore even if the end parts are not held down and the coated films peel off, the peeling-off is stopped at parts held down by the holding members from progressing, thus making it possible to prevent the coated films from peeling off any more.

In the above-described optical measurement cell, the coated films for preventing contact with the test liquid such as a chemical can be formed on the translucent members, and also the coated films can be prevented from peeling off as described above.

It is preferable that the coated films are coated in areas excluding at least the light transmission areas.

In such a configuration, when the light transmits through each of the outward surfaces of the translucent members, the light does not pass through the coated film, and therefore the light amount of transmitted light through the optical measurement cell is hard to decrease.

Meanwhile, when a coating fluorine-based resin coated film as the coated film, primer is generally undercoated to prevent peeling-off of the coated film. However, the use of primer results in a reduction in the optical transparency of the optical measurement cell.

For this reason, it is preferable that the coated films are fluorine-based resin coated films formed on the surfaces of the respective translucent members without interposing primer.

Even when the fluorine-based resin coated films are coated without interposing primer, the holding members hold down the coated films as described above, and therefore the coated films can be prevented from peeling off. This can eliminate the need for primer to avoid disadvantages caused by using primer, such as the reduction in the optical transparency.

In order to make it hard for the coated films to peel off while ensuring the optical transparency, it is preferable that primer is interposed between areas different from the light transmission areas on the surfaces of the respective translucent members and the coated films.

It is preferable that the optical measurement cell further includes a spacer that is interposed between the first translucent member and the second translucent member and forms the internal space together with the first translucent member and the second translucent member, and the spacer is provided integrally with at least one of the first translucent member and the second translucent member.

In such a configuration, the surface of the spacer can also be coated with the coated film by coating the coated film while supporting a non-coating area set on a surface of the one translucent member.

In addition, since the spacer and the one translucent member are integrally provided, the coated film coated on the spacer can also be prevented from peeling off.

Also, an optical analyzer according to the present invention is one including: the above-described optical measurement cell; a light radiation part for applying light to the optical measurement cell; and a light detection part for detecting light having transmitted through the optical measurement cell.

Further, an optical measurement cell manufacturing method according to the present invention is a manufacturing method for an optical measurement cell including: a first translucent member and a second translucent member, which sandwich an internal space in which test liquid is stored; a first holding member that holds down the circumference of a light transmission area through which the light transmits on an outward surface of the first translucent member facing a light incident side; a second holding member that holds down the circumference of a light transmission area through which the light transmits on an outward surface of the second translucent member facing a light emission side; and seal members that are respectively interposed between the first translucent member and the first holding member and between the second translucent member and the second holding member. In addition, the manufacturing method coats areas excluding parts of surfaces of the respective translucent members with coated films, and positions the end parts of the coated films on light transmission area sides of the seal members.

The optical analyzer and the manufacturing method for an optical measurement cell as described above can produce the same working effects as those of the above-described optical measurement cell.

Advantageous Effects of Invention

According to the present invention configured as described above, by forming the coated films for preventing contact with the test liquid on the translucent members, the coated films can be prevented from peeling off while suppressing contamination.

DESCRIPTION OF EMBODIMENTS

In the following, one embodiment of the optical measurement cell according to the present invention will be described with reference to the drawings.

Figure 1:
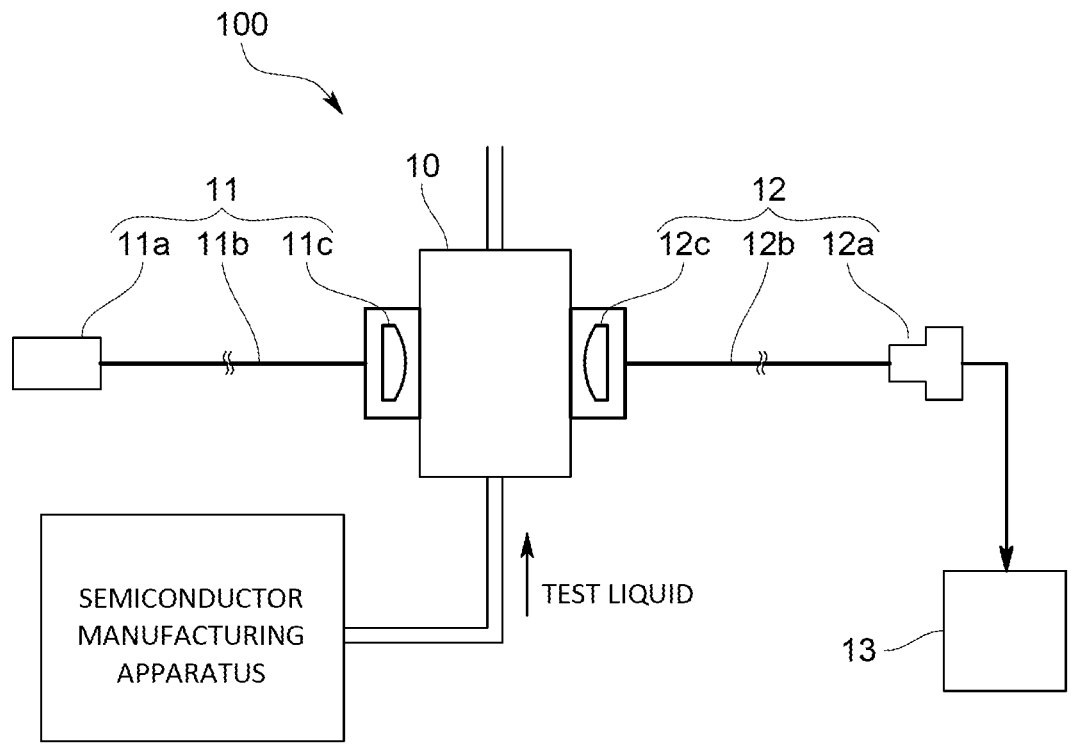
FIG. 1 is a schematic view illustrating the configuration of a chemical concentration measurement apparatus (optical analyzer) in the present embodiment.

As illustrated in FIG. 1, an optical measurement cell 10 of the present embodiment is connected to a pipe provided to a semiconductor manufacturing apparatus, and used in an optical analyzer adapted to measure the concentration or the like of a chemical (test liquid) such as hydrofluoric acid (HF).

In addition, the optical analyzer 100 illustrated in FIG. 1 includes: the optical measurement cell 10; a light radiation part 11 for applying light to the optical measurement cell 10; and a light detection part 12 for detecting light having transmitted through the optical measurement cell 10. The light radiation part 11 includes: a light source 11a; and a light guiding mechanism having an optical fiber 11b, a condenser lens 11c, and the like for guiding the light from the light source 11a to the optical measurement cell 10. Also, the light detection part 12 includes: a light detector 12a; and a light guiding mechanism having an optical fiber 12b, a condenser lens 12c, and the like for guiding the light having transmitted through the optical measurement cell 10 to the light detector 12a. Further, a calculation part 13 having received a light intensity signal from the light detector 12a calculates the concentration of a predetermined component contained in the test liquid. The concentration or the like of the chemical is controlled using the concentration obtained as described above. Note that the light radiation part 11 may be configured not to include the optical fiber 11b and/or the optical detection part 12 may be configured not to include the optical fiber 12b.

Figure 2:
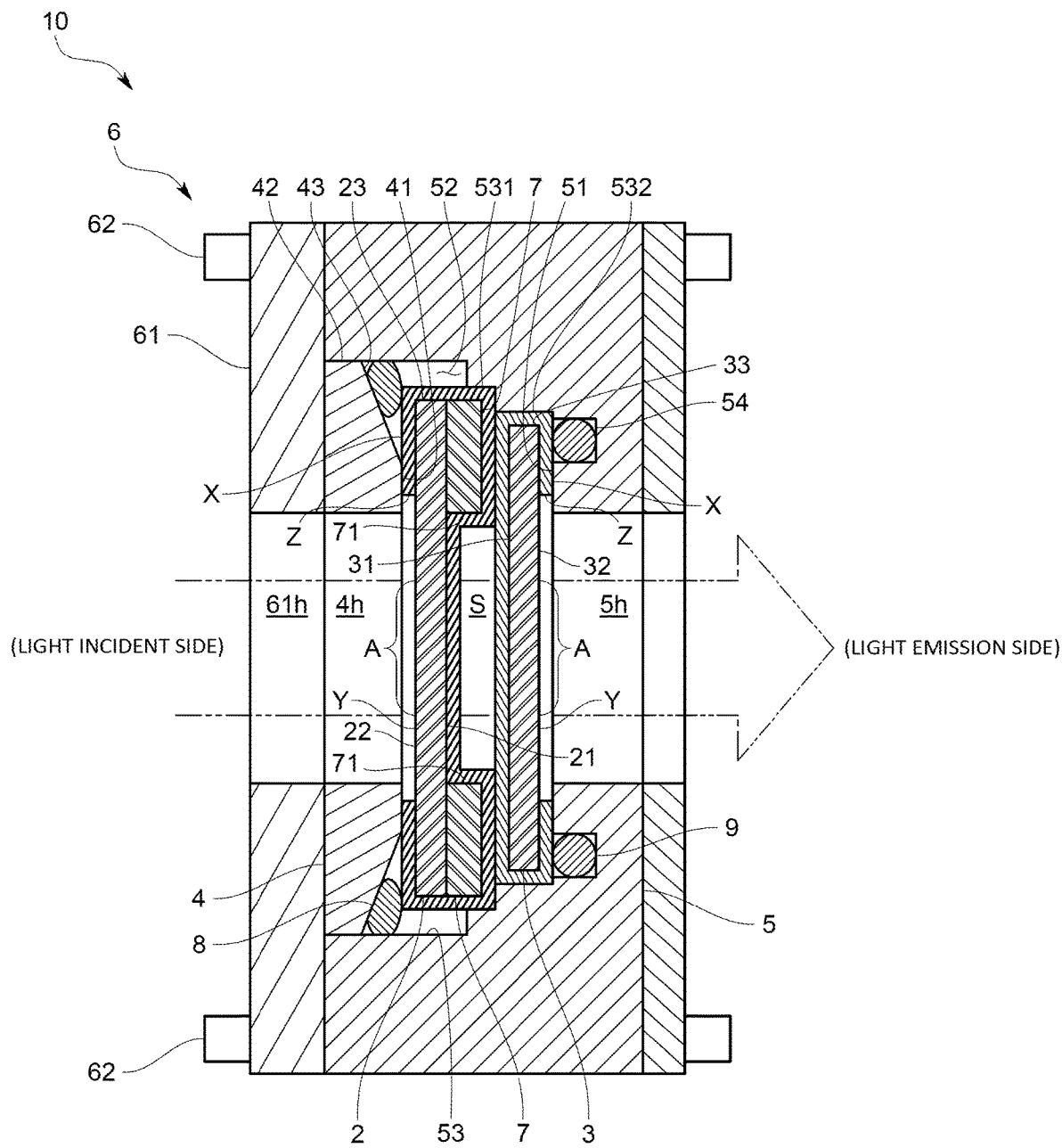
FIG. 2 is a cross-sectional view schematically illustrating the configuration of an optical measurement cell in the same embodiment.

As illustrated in FIG. 2, the optical measurement cell 10 is a flow cell having a flow path (internal space S) through which the test liquid flows. The optical measurement cell 10 is connected with an unillustrated external pipe, and here configured such that the test liquid flows along a direction perpendicular to the paper surface. In the optical measurement cell 10, the light from the light radiation part 11 is applied to the test liquid flowing through the internal space S, and the light having transmitted through the test liquid is detected by the light detection part 12.

Specifically, the optical measurement cell 10 includes: paired translucent members 2 and 3 mutually opposite sandwiching the internal space S; paired holding members 4 and 5 respectively holding the paired translucent members 2 and 3 from outer sides; and a fixing mechanism 6 adapted to fix the paired translucent members 2 and 3 and the paired holding members 4 and 5.

The paired translucent members 2 and 3 are oppositely arranged at a predetermined distance via spacers 7, of which one is a first translucent member 2 arranged on the light incident side of the internal space S and the other is a second translucent member 3 arranged on the light emission side of the internal space S.

Figure 3:
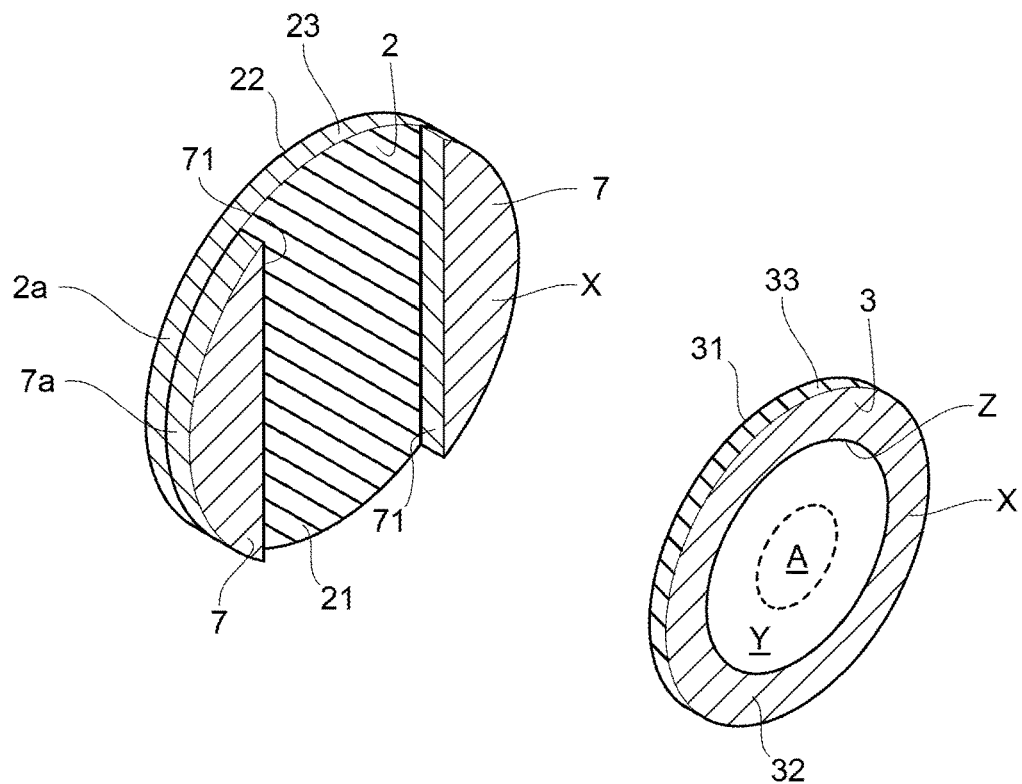
FIG. 3 is a perspective view schematically illustrating the configuration of translucent members and spacers in the same embodiment.
Figure 3:
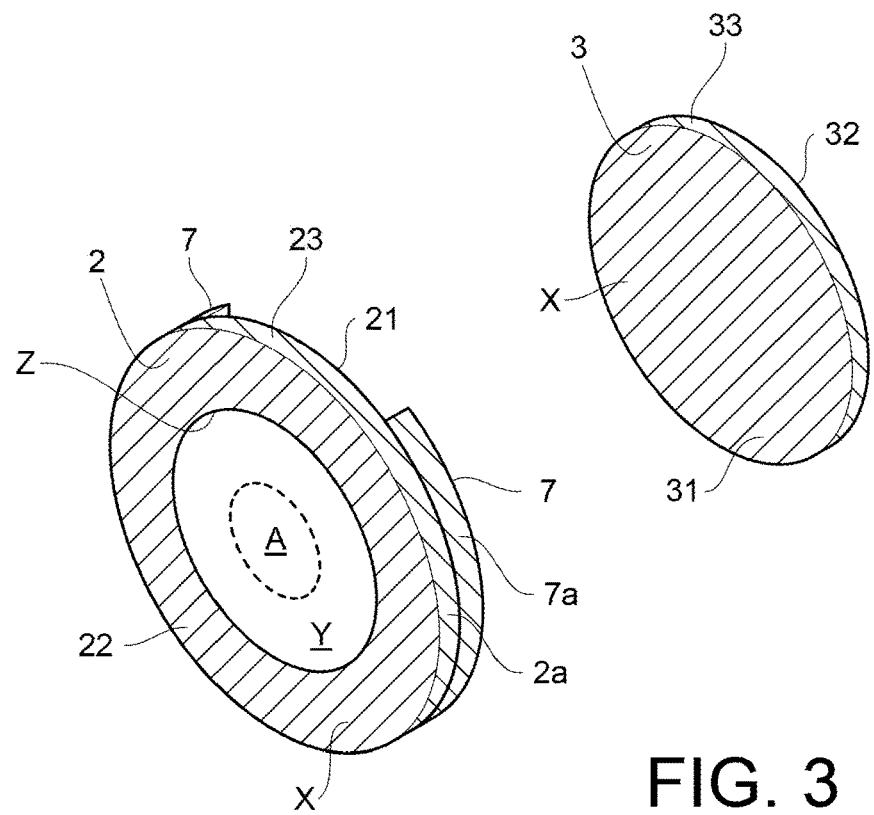

These translucent members 2 and 3 are only required to be ones capable of ensuring desired measurement accuracy with respect to the temperature change and pressure variation of the test liquid, and made of, for example, quartz or sapphire. As illustrated in FIG. 3, the shapes of the translucent members 2 and 3 are substantially disk shapes in a plan view, but may be appropriately changed to substantially rectangular shapes, substantially polygonal shapes, or the like in a plan view. In addition, the diameter dimension of the first translucent member 2 is larger than that of the second translucent member 3. However, the diameter dimensions may have reverse relationship or may be substantially the same.

As illustrated in FIGS. 2 and 3, the spacers 7 are ones for parallelizing the opposite surfaces 21 and 31 of the paired translucent members 2 and 3, as well as oppositely arranging the opposite surfaces 21 and 31 at the predetermined distance, and form the internal space S together with the paired translucent members 2 and 3.

In the present embodiment, the paired spacers 7 are oppositely arranged sandwiching the internal space S in a direction (the up/down direction in FIG. 2) orthogonal to the flow direction of the test liquid flowing through the internal space S. To describe more specifically, the opposite surfaces 71 of the paired spacers 7 are provided in such a manner as to be orthogonal to the opposite surfaces 21 and 31 of the paired translucent members 2 and 3, and a space surrounded by the opposite surfaces 71 of the paired spacers 7 and the opposite surfaces 21 and 31 of the paired translucent members 2 and 3 is the internal space S. In addition, the paired spacers 7 are not necessarily required to be arranged in the direction orthogonal to the flow direction of the test liquid flowing through the internal space S. Also, the opposite surfaces 71 of the spacers 7 are not necessarily required to be orthogonal to the opposite surfaces 21 and 31 of the translucent members 2 and 3, but for example, may be tilted with respect to the opposite surfaces of the translucent members 2 and 3.

As with the translucent members 2 and 3, the respective spacers 7 are only required to be one capable of ensuring desired measurement accuracy with respect to the temperature change and pressure variation of the test liquid, and made of, for example, quartz or sapphire.

The spacers 7 in the present embodiment are provided integrally with at least one of the translucent members 2 and 3. Specifically, both the spacers 7 are provided integrally with the first translucent member 2 by, for example, optical contact. These spacers 7 are of a shape where part of a disk is cut in a plan view, and specifically ones formed by cutting a disk having substantially the same shape as that of the first translucent member 2. In doing so, as illustrated in FIG. 3, the partially circular-shaped outer edges 7a of the spacers 7 mutually overlap the outer edge 2a of the first translucent member 2 in a plan view.

The paired holding members 4 and 5 are ones that respectively hold down the paired translucent members 2 and 3 via seal members 8 and 9, of which one is a first holding member 4 arranged further on the light incident side than the first translucent member 2 and the other is a second holding member 5 arranged further on the light emission side than the second translucent member 3.

The first holding member 4 is one that, toward the light emission side, presses the outward surface 22 of the first translucent member 2 facing the light incident side, and has a pressing surface 41 that presses the circumference of a light transmission area A through which the light transmits on the outward surface 22, i.e., a radially outer side on the outward surface 22 than the light transmission area A. Specifically, the first holding member 4 is formed in a substantially cylindrical shape, and a tilted ring having a tapered tilted surface 43 formed by obliquely cutting out the substantially cylindrical shape from about the middle of the outer circumferential surface 42 to about the middle of the pressing surface 41. Also, in the center part of the first holding member 4, a through-hole 4h for introducing the light to the first translucent member 2 is formed.

The second holding member 5 is one that holds down the paired translucent members 2 and 3 with the pressing surface 41 of the first holding member 4. The second holding member 5 is one that presses the outward surface 32 of the second translucent member 3 facing the light emission side, and has a pressing surface 51 that presses the circumference of a light transmission area A through which the light transmits on the outward surface 32, i.e., a radially outer side on the outward surface 32 than the light transmission area A. Specifically, the second holding member 5 is one formed with a housing recess part 52 housing the paired translucent members 2 and 3 and the first holding member 4.

The housing recess part 52 is formed in, for example a substantially cylindrical shape (substantially circular shape in a plan view) fitted with the paired translucent members 2 and 3, and a space formed by the inner circumferential surface 53 having a cross-sectionally substantially circular shape and the bottom surface that is a surface orthogonal to the inner circumferential surface 53. In addition, the bottom surface is the above-described pressing surface 51.

In the pressing surface 51, a through-hole 5h through which the light having passed through the second translucent member 3 passes is formed, and the light having passed through the through-hole 5h travels toward the light detection part 12.

In addition, the inner circumferential surface 53 includes a large diameter part 531 integrated with the first translucent member 2 and fitted with the spacers 7 and a small diameter part 532 fitted with the second translucent member 3. By providing the large diameter part 531 and the small diameter part 532, the first translucent member 2 and the second translucent member 3 can be positioned in the radial direction.

The first seal member 8 interposed between the first translucent member 2 and the first holding member 4 is provided in an area surrounded by the inner circumferential surface 53 of the housing recess part 52, the tilted surface 43 of the first holding member 4, and the outward surface 22 of the first translucent member 2, and an O-ring made of, for example, polytetrafluoroethylene (PTFE), fluororubber (FKM), or the like.

The second seal member 9 interposed between the second translucent member 3 and the second holding member 5 is provided in a ring-shaped concave groove 54 formed in the pressing surface 51 that is the bottom surface of the housing recess part 52, and an O-ring made of, for example, polytetrafluoroethylene (PTFE), fluororubber (FKM), or the like.

In such a configuration, the paired translucent members 2 and 3 are held down by the paired holding member 4 and 5, and thereby the first seal member 8 and the second seal member 9 are crushed. As a result, even if the test liquids leaks out from the internal space S to the housing recess part 52 through the gap between the paired translucent members 2 and 3, the test liquid can be prevented from leaking out to the inner sides of the seal members 8 and 9. This enables the test liquid to be prevented from leaking outside the cell.

The fixing mechanism 6 is one for fixing the paired translucent members 2 and 3 and paired holding members 4 and 5 housed in the housing recess part 52, and specifically, includes: a lid body 61 for covering the housing recess part 52; and connecting members 62 for connecting the lid body 61 to the second holding member 5.

The lid body 61 is one that presses the first holding member 4 toward the light emission side, and here the outer circumferential part of the lid body 61 abuts on the surface of the second holding member 5 facing the light incident side. In the lid body 61, a through-hole 61h through which the light emitted from the light radiation part 11 passes is formed, and the light having passed through the through-hole 61h travels toward the light transmission area A of the first translucent member 2.

The connecting members 62 are ones inserted into unillustrated communication holes respectively penetrating through the lid body 61 and the second holding member 5, and for example, bolts screwed into female screw parts formed on the communication holes. In the present embodiment, the communication holes are formed at multiple positions of the lid body 61 and second holding member 5, and the connecting members 62 are respectively inserted into these communication holes.

In the optical measurement cell 10 configured as described above, as illustrated in FIGS. 2 and 3, the surfaces of the paired translucent members 2 and 3 are coated with coated films X for preventing contact between the test liquid and the translucent members 2 and 3.

When forming the coated films X on the surfaces of the translucent members 2 and 3, it is necessary to support some parts of the translucent members 2 and 3, and support surfaces supported cannot be formed with the coated films X. In addition, it is conceivable that by supporting second support surfaces different from the support surfaces not formed with the coated films X and again forming the coated films X on the surfaces of the translucent members 2 and 3, the coated films X can be formed on the entire surfaces; however, in this case, the coated films X on the second support surfaces are peeled off, and ultimately the coated films X cannot be formed on the entire surfaces.

Accordingly, on the surfaces of the paired translucent members 2 and 3, the coated films X are formed in areas excluding parts, i.e., on the surfaces of the translucent members 2 and 3, non-coating areas Y where the coated films X are not formed are set.

In the present embodiment, in areas excluding the non-coating areas Y of the surfaces of the translucent members 2 and 3, the coated films X are formed, and specifically fluorine-based resin coated films X by fluorine coating are formed.

To briefly describe a normal procedure for the fluorine coating here, degreasing, surface treatment (blasting), primer treatment, and heat treatment are performed on the surface of a base material in this order, and then the surface is coated with a coating material.

On the other hand, in the present embodiment, without undercoating the surfaces of the translucent members 2 and 3 with primer or the like, i.e., without interposing primer between the surfaces of the translucent members 2 and 3 and the fluorine-based resin coated films X, the fluorine-based resin coated films X are directly formed on the surfaces of the translucent members 2 and 3. In addition, the other steps such as degreasing, surface treatment (blasting), and heat treatment are appropriately performed as needed.

To describe more specifically, since the first translucent member 2 is integrally provided with the spacers 7 as described above, on the surfaces of the first translucent member 2, areas excluding the non-coating area Y and areas in contact with the spacers are formed with the coated film X, and the non-coating area Y is set on the outward surface 22 of the first translucent member 2.

On the other hand, on the surfaces of the second translucent member 3, areas excluding the non-coating area Y are formed with the coated film X, and the non-coating area Y is set on the outward surface 32 of the second translucent member 3.

The above-described configuration allows the boundaries between the coating areas formed with the coated films X and the non-coating areas Y to lie on the outward surfaces 22 and 32 of the respective translucent members 2 and 3, and specifically the boundaries lie on the light transmission area A sides of the above-described seal members 8 and 9, i.e., on the inner sides of the seal members 8 and 9.

That is, the coated films X are formed on surfaces contactable with the test liquid on the surfaces of the translucent members 2 and 3, specifically, on the opposite surfaces 21 and 31 forming the internal space S, side circumferential surfaces 23 and 33, outer sides of the outer surface 22 and 32 than the seal members 8 and 9.

In addition, parts positioned at the boundaries between the coating areas and the non-coating areas Y, i.e., the end parts Z of the coated films Z are positioned between the outward surfaces 22 and 32 of the translucent members 2 and 3 and the holding members 4 and 5, and held down by the holding members 4 and 5 against the translucent members 2 and 5. Also, since the end parts Z of the coated films X are positioned between the outward surfaces 22 and 32 of the translucent members 2 and 3 and the holding members 4 and 5, the wholes of the light transmission areas A on the outward surfaces 22 and 32 fall within the non-coating areas Y. Note that the end parts Z of the coated films refer to parts having coated film end surfaces or the vicinities of the coated film end surfaces positioned at the boundaries between the coating areas and the non-coating areas Y.

Meanwhile, if the pressure resistance of the optical measurement cell 10 is low, as the supply pressure of the test liquid to be supplied to the internal space S is increased, the interval between the paired translucent members 2 and 3 increases to increase light path length, and thereby absorbance is changed. The change in absorbance becomes more pronounced as the pressure resistance of the optical measurement cell 10 decreases.

Figure 4:
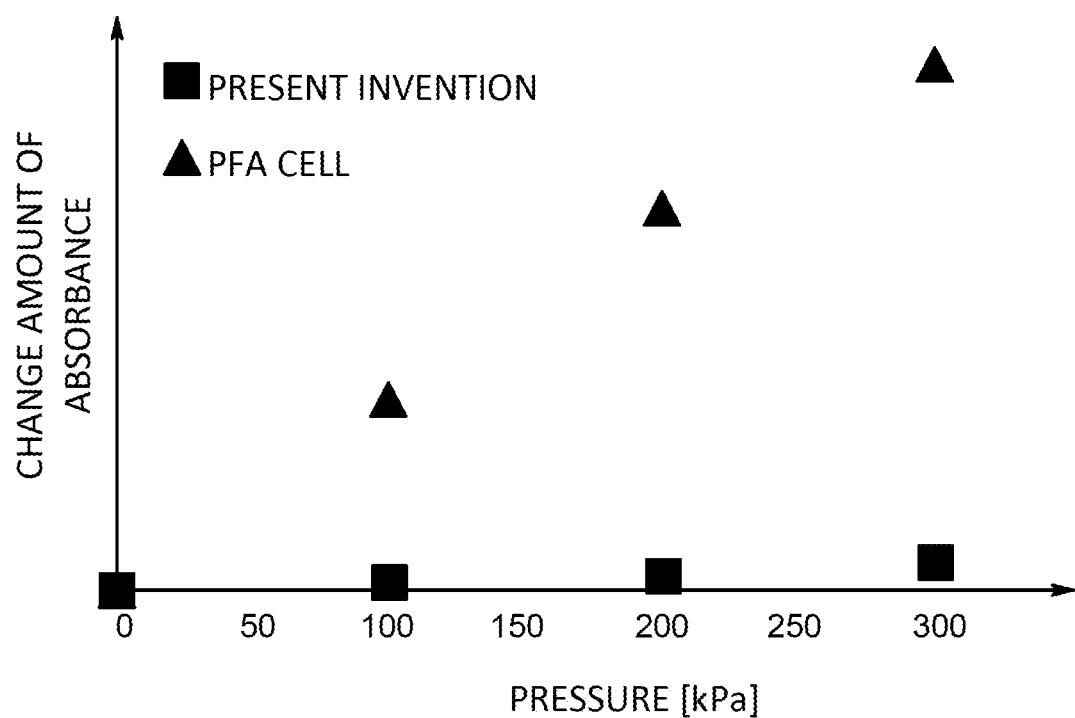
FIG. 4 is a graph illustrating the experimental results of comparing pressure resistance between the optical measurement cell in the same embodiment and a conventional PFA cell.

Therefore, in order to compare pressure resistance between the optical measurement cell 10 of the present embodiment and a PFA cell having corrosion resistance to the chemical, the effect of the supply pressure of the test liquid to the internal space S on absorbance was compared. The resulting experimental results are illustrated in FIG. 4. In addition, sapphire was used for the translucent members 2 and 3.

From the experimental results, it turns out that the PFA cell has corrosion resistance as described above but is inferior in pressure resistance because as the supply pressure of the test liquid is increased, the change amount of absorbance increases. On the other hand, it turns out that the optical measurement cell 10 of the present embodiment has dramatically improved pressure resistance as compared with the PFA cell while ensuring corrosion resistance by the coated films X because even when the supply pressure of the test liquid is increased, the change amount of absorbance is very small.

Figure 5:
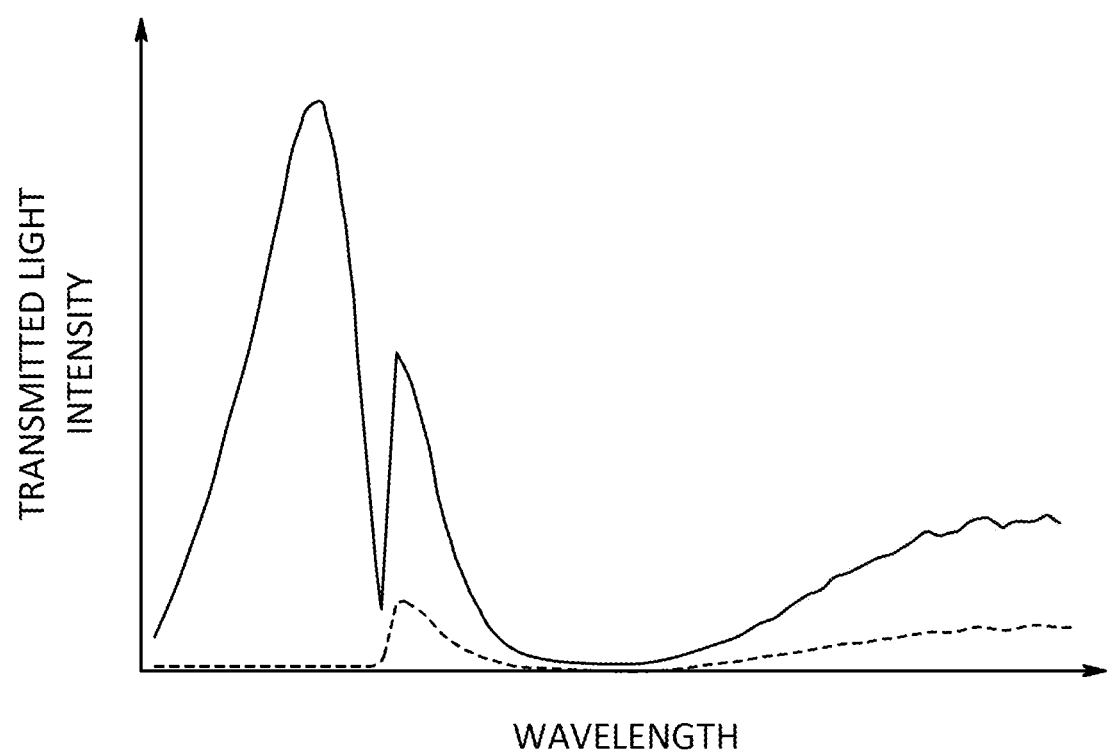
FIG. 5 is a graph illustrating the experimental results of comparing optical transparency between the optical measurement cell in the same embodiment and the conventional PFA cell.

Next, FIG. 5 illustrates the experimental results of comparing optical transparency between the optical measurement cell 10 of the present embodiment and the PFA cell as a conventional optical measurement cell.

From the experimental results, it turns out that in both a short wavelength area (e.g., the ultraviolet area) and a long wavelength area (e.g., the near infrared area), the optical measurement cell 10 of the present embodiment has high optical transparency as compared with the conventional PFA cell, and that considering the experimental results illustrated in FIG. 4 together, the optical measurement cell 10 of the present embodiment is superior in corrosion resistance, pressure resistance, and optical transparency.

In the optical measurement cell 10 according to the present embodiment, since the coated films are formed in the areas contactable with the test liquid on the surfaces of the paired translucent members 2 and 3, contamination can be suppressed and corrosion resistance can be improved. In addition, since the holding members 4 and 5 hold down the end parts of the coated films X, the coated films X can be prevented from peeling off.

Also, since the holding members 4 and 5 hold down the end parts of the coated films X to prevent peeling-off, the need for undercoating the surfaces of the translucent members 2 and 3 with primer can be eliminated. This makes it possible to avoid disadvantages caused by using primer, such as a reduction in optical transparency due to coating with primer and the occurrence of contamination due to an organic solvent contained in primer.

Further, in addition to eliminating the need for undercoating with primer, the wholes of the light transmission areas A on the outward surfaces 22 and 23 of the translucent members 2 and 3 are adapted to fall within the non-coating areas Y, and therefore optical transparency can be improved than before as illustrated in the experimental results of FIG. 5.

Note that the present invention is not limited to the above-described embodiment.

Figure 6:
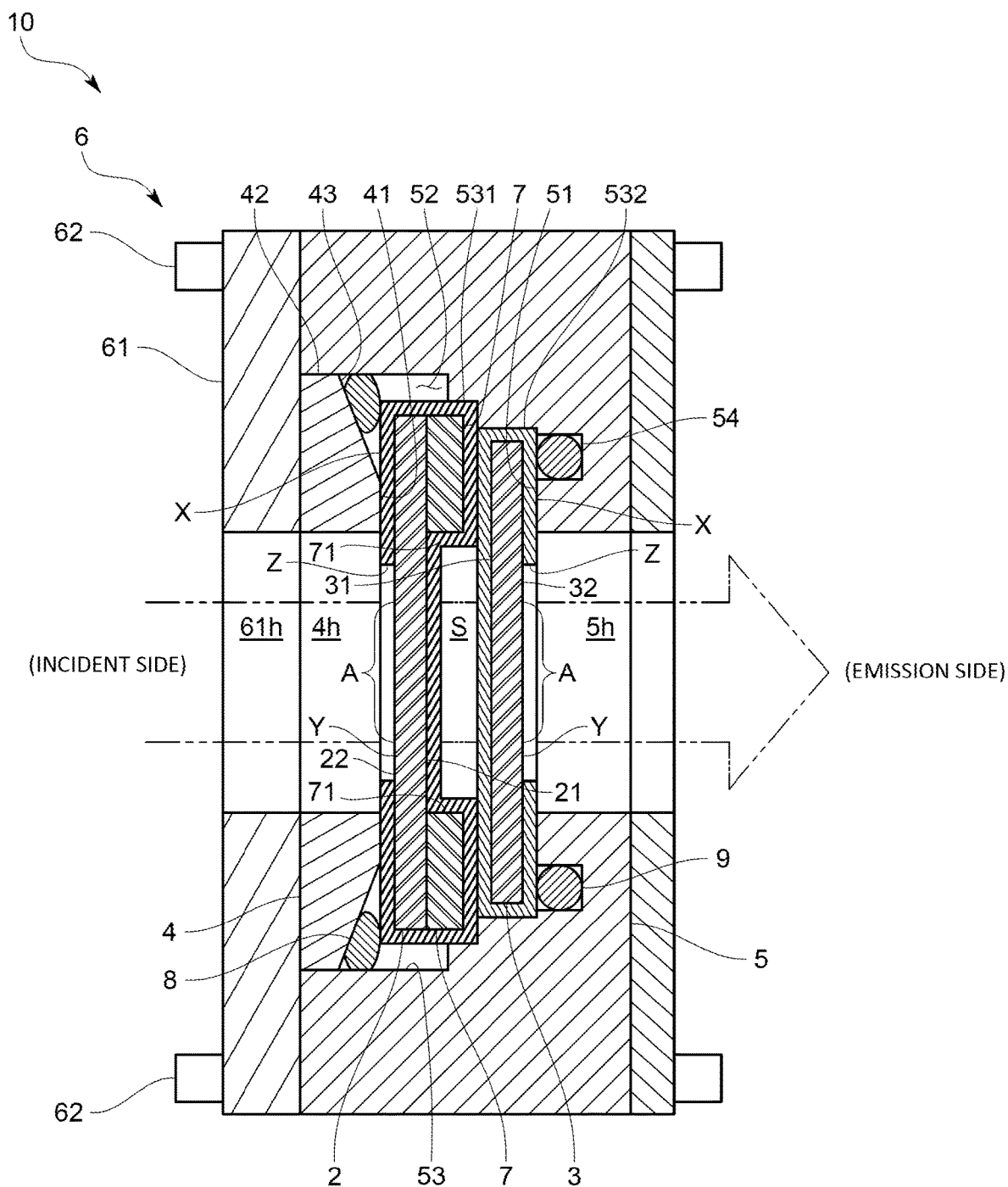
FIG. 6 is a cross-sectional view schematically illustrating the configuration of an optical measurement cell in a variation.

For example, in the above-described embodiment, the holding members 4 and 5 hold down the end parts Z of the coated films X. However, as illustrated in FIG. 6, when the end parts Z of the coated films are positioned further on the light transmission area A sides than in the above-described embodiment, and the end parts Z are not interposed between the holding members 4 and 5 and the translucent members 2 and 3, the holding members 4 are not necessarily required to hold down the end parts Z of the coated films X, but only have to hold down the seal member 8, 9 sides rather than the end parts Z.

In such a configuration, even if any of the coated films X peels off from an end part Z, the peeling-off is stopped at a part held down by a holding member 4 or 5 from progressing, and therefore the coated film X can be prevented from peeling off any more.

Also, in the above-described embodiment, the wholes of the light transmission areas A on the outward surfaces 22 and 32 of the respective translucent members 2 and 3 fall within the non-coating areas Y. However, parts of the light transmission areas A may be coated with the coated films X.

Further, in the above-described embodiment, the coated films X are the fluorine-based resin coated films by fluorine coating. However, the coated film X are not limited to this but may be, for example, DLC coated films or the like.

Also, in the above-described embodiment, the paired spacers 7 are provided integrally with the first translucent member 2. However, for example, one of the spacers 7 may be provided integrally with the first translucent member 2 and the other spacer 7 may be provided integrally with the second translucent member 3, or the paired spacers 7 may be provided integrally with the second translucent member 3.

Further, the paired spacers 7 and each of the translucent members 2 and 3 may be provided as separate bodies. In this case, as the material of the spacers 7, without limitation to quartz or sapphire, a fluorine-based resin or the like may be used when, for example, the test liquid is low reactive one such as mildly acidic or mildly alkaline one.

In addition, the first translucent member 2, the second translucent member 3, and the paired spacers 7 may be integrally formed by, for example, optical contact or the like, and then a coated film X may be deposited on the outer surfaces of them and the inner surfaces forming the internal space S. In this case, the deposition is preferably performed with at least the light transmission area A on the outward surface 22 of the first translucent member 2 and the light transmission area A on the outward surface 32 of the second translucent member 3 supported.

Figure 7:
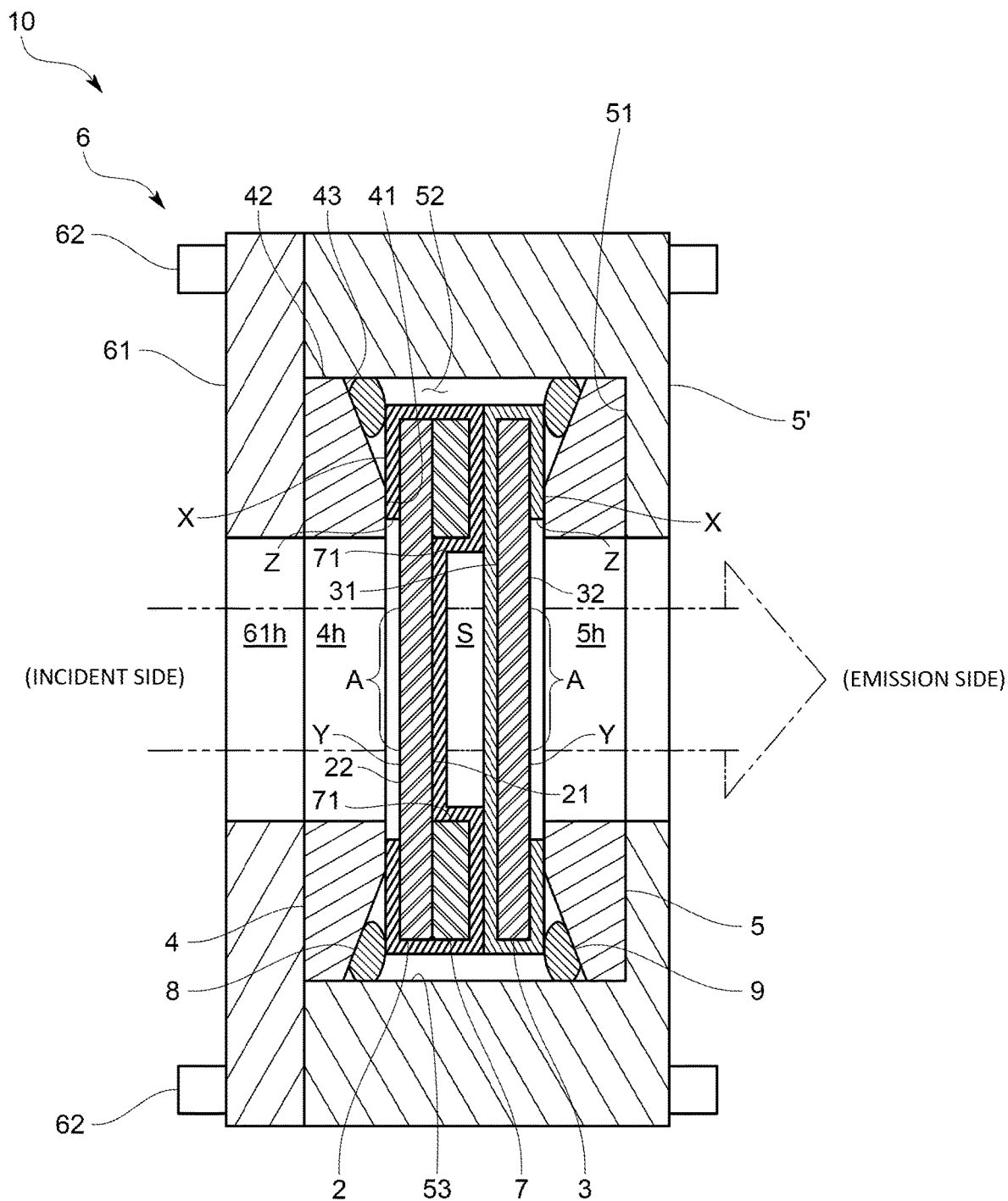
FIG. 7 is a cross-sectional view schematically illustrating the configuration of an optical measurement cell in a variation.

Further, in the above-described embodiment, the second holding member 5 is one having the housing recess part 52. However, as illustrated in FIG. 7, the housing recess part 52 may be provided in a housing member 5' that is a different member from the second holding member 5. In this case, the second holding member 5 can be formed as a tilted ring as with, for example, the first holding member 4.

In addition, in the above-described embodiment, the lid body 61 and the second holding member 5 are connected by the connecting members 62. However, as illustrated in FIG. 6, the lid body 61 may be connected to a different member (in this case, the housing member 5') from the second holding member 5.

Also, in the above-described embodiment, the surfaces of the translucent members 2 and 3 are subjected to the fluorine coating without primer treatment. However, for example, primer treatment may be performed on areas different from the light transmission areas on the surfaces of the translucent members 2 and 3, and then fluorine coating may be performed.

Interposing primer between the coated films X and the areas different from the light transmission areas A on the surfaces of the translucent members 2 and 3 as described above can make it harder for the coated films to peel off than in the above-described embodiment while ensuring optical transparency equivalent to that in the above-described embodiment.

Further in addition, in the above-described embodiment, the sample is liquid but may be gas.

Besides, it goes without saying that the present invention is not limited to the above-described embodiment but can be variously modified without departing from the scope thereof.

LIST OF REFERENCE CHARACTERS

100: Optical analyzer
10: Optical measurement cell
S: Internal space
2, 3: Translucent member
A: Light transmission area
4, 5: Holding member
7: Spacer
8, 9: Seal member
Y: Non-coating area
X: Coated film
Z: End part

The invention claimed is:

1. An optical measurement cell comprising a first translucent member and a second translucent member, the first and second translucent members sandwiching an internal space in which test liquid is stored, and configured so that light incident on the first translucent member passes through the internal space and is emitted from the second translucent member, the optical measurement cell further comprising:
   a first holding member that holds down the first translucent member along the circumference of a first light transmission area through which the light is transmitted to a first outer surface of the first translucent member, the first outer surface facing a light incident side;
   a second holding member that holds down the second translucent member along the circumference of a second light transmission area through which the light is transmitted to a second outer surface of the second translucent member, the second outer surface facing a light emission side; and
   seal members that are respectively interposed between the first translucent member and the first holding member and between the second translucent member and the second holding member, wherein
   first areas of corresponding first surfaces of the respective first translucent members are coated with films, second areas of corresponding second surfaces of the respective second translucent members are not coated with the films, and end parts of the films are positioned on light transmission area sides of the seal members.

2. The optical measurement cell according to claim 1, wherein
   the films first areas are coated in areas excluding at least the first light transmission area.

3. The optical measurement cell according to claim 1, wherein
   the films are fluorine-based resin films formed on the surfaces of the first translucent member and the second translucent member without interposing primer.

4. The optical measurement cell according to claim 1, wherein
   primer is interposed between areas different from the first light transmission area and the second light transmission area on the surfaces of the respective first translucent member, the second translucent member, and the films.

5. The optical measurement cell according to claim 1, further comprising
   a spacer that is interposed between the first translucent member and the second translucent member and forms the internal space together with the first translucent member and the second translucent member, wherein
   the spacer is provided integrally with at least one of the first translucent member and the second translucent member.

6. An optical analyzer comprising:
   the optical measurement cell according to claim 1;
   a light radiation part for applying light to the optical measurement cell; and
   a light detection part for detecting light having transmitted through the optical measurement cell.

7. A manufacturing method for an optical measurement cell comprising: a first translucent member and a second translucent member, the first and second translucent members sandwiching an internal space in which test liquid is stored; a first holding member that holds down the first translucent member along the circumference of a first light transmission area through which the light is transmitted to a first outer surface of the first translucent member, the first outer surface facing a light incident side; a second holding member that holds down the second translucent member along the circumference of a second light transmission area through which the light is transmitted to a second outer surface of the second translucent member, the second outer surface facing a light emission side; and seal members that are respectively interposed between the first translucent member and the first holding member and between the second translucent member and the second holding member, the manufacturing method comprising:
   coating first areas of corresponding first surfaces of the respective first translucent members with films, and positioning end parts of the films on light transmission area sides of the seal members.

* * * * *